United States Patent
Friedrich et al.

(10) Patent No.: US 7,599,959 B2
(45) Date of Patent: Oct. 6, 2009

(54) CENTRALIZED ACCESS AND MANAGEMENT FOR MULTIPLE, DISPARATE DATA REPOSITORIES

(75) Inventors: Michael Friedrich, Kehl (DE);
Alexander Primbs, Sinsheim (DE);
Uwe Steigmann, Bad Rappenau (DE);
Marc Noe, Mosbach (DE)

(73) Assignee: SAP AG, Walldorf (DE)

( * ) Notice: Subject to any disclaimer, the term of this patent is extended or adjusted under 35 U.S.C. 154(b) by 240 days.

(21) Appl. No.: 10/308,204

(22) Filed: Dec. 2, 2002

(65) Prior Publication Data
US 2004/0107212 A1 Jun. 3, 2004

(51) Int. Cl.
*G06F 17/30* (2006.01)

(52) U.S. Cl. .................. 707/104.1; 707/9; 707/10; 707/202; 709/202; 709/203; 709/229

(58) Field of Classification Search ............... 707/9–10, 707/104.1, 202; 709/202–203, 229
See application file for complete search history.

(56) References Cited

U.S. PATENT DOCUMENTS

| | | | | |
|---|---|---|---|---|
| 5,822,747 | A * | 10/1998 | Graefe et al. .................. 707/2 |
| 5,870,746 | A * | 2/1999 | Knutson et al. ............. 707/101 |
| 5,881,311 | A * | 3/1999 | Woods .......................... 710/4 |
| 6,105,067 | A * | 8/2000 | Batra .......................... 709/227 |
| 6,327,594 | B1 * | 12/2001 | Van Huben et al. ......... 707/200 |
| 6,484,177 | B1 * | 11/2002 | Van Huben et al. .......... 707/10 |
| 6,732,181 | B2 * | 5/2004 | Lim et al. .................... 709/229 |
| 7,134,008 | B2 * | 11/2006 | Dutt et al. ....................... 713/1 |
| 7,149,730 | B2 * | 12/2006 | Mullins et al. .................. 707/2 |
| 7,346,921 | B2 * | 3/2008 | Murren et al. .................. 726/1 |
| 2002/0091705 | A1 * | 7/2002 | Mitomi et al. .......... 707/103 R |
| 2002/0143943 | A1 * | 10/2002 | Lee et al. ..................... 709/225 |
| 2003/0065898 | A1 * | 4/2003 | Flamma et al. ............. 711/165 |
| 2003/0095555 | A1 * | 5/2003 | McNamara et al. ......... 370/401 |
| 2003/0096600 | A1 * | 5/2003 | Lewis et al. ................. 455/412 |
| 2003/0110212 | A1 * | 6/2003 | Lewis ......................... 709/203 |
| 2004/0083222 | A1 * | 4/2004 | Pecherer ..................... 707/100 |
| 2004/0139070 | A1 * | 7/2004 | Dysart et al. ................... 707/3 |
| 2004/0215651 | A1 * | 10/2004 | Markowitz et al. .......... 707/102 |
| 2007/0294410 | A1 * | 12/2007 | Pandya et al. ............... 709/226 |

* cited by examiner

*Primary Examiner*—Don Wong
*Assistant Examiner*—Hanh B Thai
(74) *Attorney, Agent, or Firm*—Mintz, Levin, Cohn, Ferris, Glovsky & Popeo, P.C.

(57) ABSTRACT

Systems and techniques to access data in a computer system provide centralized data storage management for facilitating access to a plurality of different data repositories. In general, in one implementation, the technique includes sending a data access request to a data storage manager and identifying at least one of a plurality of repositories for satisfying the data access request. The repositories may be of different types. In addition, data may be partitioned among the repositories according to data object types and/or attribute characteristics. Once an appropriate repository is identified, the data access request is fulfilled using the identified repository.

26 Claims, 2 Drawing Sheets

|  | EUROPEAN USERS | U.S. USERS | INDEPENDANT CONTRACTORS | GROUPS |
|---|---|---|---|---|
| NAME | EUR. LDAP | U.S. DB | EXT. LDAP | CORP. DB |
| ADDRESS | EUR. LDAP | U.S. DB | EXT. LDAP | — |
| POSITION | EUR. LDAP | U.S. DB | EXT. LDAP | — |
| PICTURE | EUR. SAP R/3 | U.S. SAP R/3 | — | — |
| CURRENT PROJECTS | EUR. SAP R/3 | U.S. SAP R/3 | EXT. LDAP | CORP. DB |
| GROUP MEMBERS | — | — | — | CORP. DB |

CENTRALIZED ACCESS AND MANAGEMENT FOR MULTIPLE, DISPARATE DATA REPOSITORIES

BACKGROUND

The following description relates to data management in a computer storage system, for example, centralized access to and management of multiple, disparate data repositories.

Computer systems in an enterprise environment typically represent a plurality of different applications, information, and services that may have varying degrees of interaction and integration. The various components generally use their own information bases, but there may be a significant degree of overlap of information and resources used by the different components. In such a case, a common storage medium can be used to store information that is shared among several applications.

For example, user-specific information may be used by multiple different applications. Such user-specific information may be stored in a single Lightweight Directory Access Protocol (LDAP) repository, which acts as a centralized directory for common information, much like a company-wide address book. The information in the common storage medium may then be accessed by a variety of different applications or platforms using a standard protocol. The use of a centralized directory simplifies maintenance, reduces inconsistency, and avoids redundancy.

SUMMARY

The following description teaches systems and techniques for accessing data in a computer system using centralized data storage management of a plurality of data repositories. The present inventors recognized that conventional data storage techniques require that data reside within a single data repository to be accessible across multiple, disparate, yet interconnected systems or applications. Accordingly, the inventors developed data storage systems and techniques that allow different applications and/or systems to access data distributed among multiple repositories through a centralized data storage manager. As a result, the multiple repositories may be of different types and/or may allow data to be partitioned according to the type of data object with which the data is associated and/or according to characteristics of an attribute that the data represents.

In one aspect, the techniques involve a method for accessing data in a computer system. A data access request is sent to a data storage manager. At least one repository from a plurality of repositories is identified for satisfying the data access request. Data is selectively partitioned among the repositories, and the plurality of repositories includes repositories of at least two different types that store information relating to data objects. The data access request is then fulfilled using the at least one identified repository.

In some embodiments, data relating to different data objects may be selectively partitioned among the repositories according to characteristics of the data objects. Attributes may also be associated with each data object, and data relating to different attributes may be selectively partitioned among the repositories according to characteristics of the attributes. The identifying of at least one repository may involve identifying a subset of the plurality of repositories based on information stored in the data storage manager and determining which of the subset of repositories store the requested data based on information stored in an adapter associated with each repository. Data defining the existence of different data objects may be stored in different repositories. Data relating to different attributes of the same data object may also be stored in different repositories. The data objects and attributes stored in the plurality of repositories may relate to user management data. The types of repositories may be differentiated based on differences in at least one of: protocols used to access data, the manner in which data is organized, and the technology upon which the repositories are based. The data access request may relate to creating a data object, writing data, reading data, or searching data.

In another aspect, the techniques involve a method for facilitating data storage across multiple repositories. A plurality of data objects are created. For each data object, a home repository of a plurality of repositories for indicating whether the data object exists is identified. The home repository is identified based on selected characteristics of the data object. Data relating to each data object is stored in the respective home repository, and a plurality of applications are enabled to access to the data stored in the plurality of repositories through a centralized data storage manager.

In some embodiments, the selected characteristics of each data object may comprise a set of attributes and the set of attributes may be stored in the respective home repository. An additional attribute, for a data object may also be defined, and a repository from the plurality of repositories for storing the additional attribute may be identified based on a type of information represented by the attribute. The plurality of repositories may include at least one database repository and at least one LDAP repository.

In yet another aspect, the techniques involve a method of facilitating data storage across multiple repositories. A plurality of data objects are created, with each data object having a plurality of associated attributes. A first subset of the attributes for each data object are stored in a first repository, and a second subset of the attributes for each data object are stored in a second repository. Access to the data stored in the first repository and the second repository by a plurality of applications is provided through a centralized data storage manager.

In some embodiments, the first repository may define whether a particular data object exists. The second subset of attributes for the particular data object may supplement information stored in the first subset of attributes for the particular data object. Access to the data stored in the first repository and the second repository may be provided such that the difference between the repositories are transparent to the plurality of applications.

In another aspect, a data storage system for a computer system includes a plurality of data repositories for storing data, a plurality of applications, and a data storage manager. Data is partitioned among the data repositories based on characteristics of the data. The data storage manager is operable to receive a data access request from one of the applications, to identify an appropriate data repository for fulfilling the data access request, and to access the requested data in accordance with the request.

In some embodiments, the plurality of data repositories may include at least two different types of data repositories. The plurality of repositories may store information relating to a plurality of data objects, and data may be partitioned among the repositories according to data object types and/or attribute types. The system may include at least one application program interface for interfacing the applications with the data storage manager. An adapter may also be associated with each repository for interfacing the data storage manager with the repositories. The data storage manager may store adapter information relating to which adapters are available and what types of data are handled by each of the adapters. The data storage manager may use the adapter information to identify the appropriate data repository for fulfilling the data access request. The data storage manager may further contact at least one adapter and use information received from the adapter to identify the appropriate data repository. Each adapter may store information identifying data types handled by the adapter and may map data between the data storage manager and the data repository.

In yet another aspect, an article comprising a machine-readable medium may store instructions operable to cause one or more machines to perform certain operations, including receiving a data access request, identifying at least one repository from a plurality of repositories for satisfying the data access request, and fulfilling the data access request using the at least one identified repository. The plurality of repositories can include at least two different types of repositories and data is selectively partitioned among the repositories.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

The systems and techniques described here relate to centralized access to and management of multiple, disparate data repositories in a computer system. For example, user management data, such as user and group information, may often be shared between many applications. Accordingly, in one implementation, a user management engine can handle cross-platform user identity management and may facilitate the creation, reading, writing, and searching of user-specific data across different servers. The user-specific data may relate to user identities, group identities, role identities, and/or their respective assignments. In this manner, information that is distributed across a variety of data repositories on different servers can be combined into a single logical whole for purposes of managing user data and allowing, for example, single sign-on access to multiple, disparate systems or platforms. The user management engine may also be designed so that the location where information is read from or written to is easily configurable.

Prior to these techniques, user management data that was to be used to regulate access to, or to be accessible across, multiple disparate, yet interconnected systems had to reside within a single data store, such as an LDAP repository. Contrary to prior techniques, the techniques described here do not require data that already exists in other data stores to be moved or copied to a single data store. In other words, they do not require the creation of a new data repository instead of or in addition to repositories that already exist. In addition, the described techniques allow different types of repositories (e.g., that use different proprietary or standardized protocols) to be combined into a single logical whole. From the perspective of applications that write or otherwise access the stored data, the described techniques combine the different repositories such that they appear to be one central storage. Moreover, different data repositories can be used to provide vertical (e.g., attribute-based) or horizontal (e.g., user-based) partitioning. For example, information can be stored or read from different repositories based on the attributes and/or the users with which the information is associated.

Figure 1:
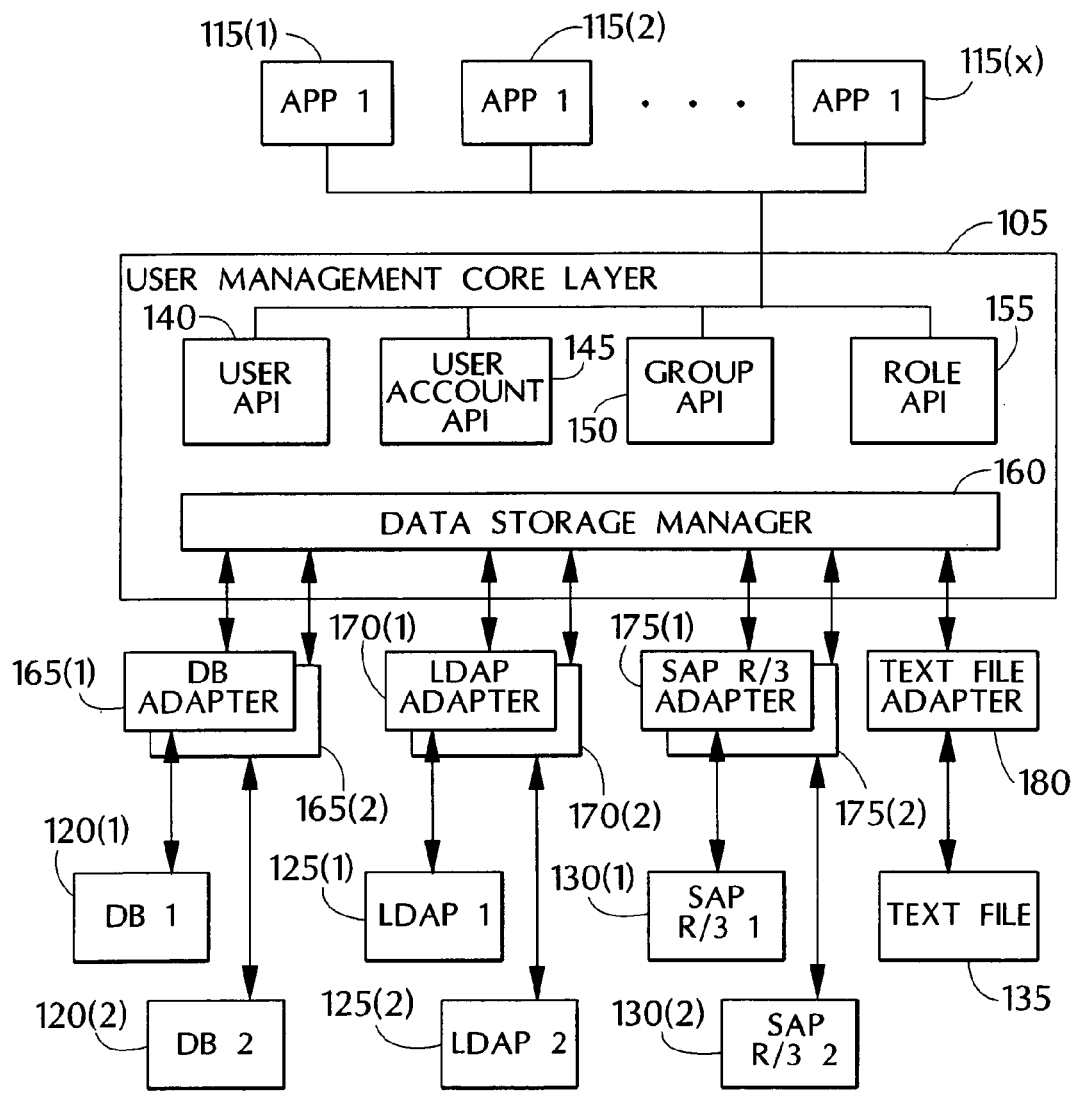
FIG. 1 shows a block diagram of a user management system for use in connection with a computer system.

FIG. 1 shows a block diagram of a user management system 100 for use in connection with a computer system. The primary components of the user management system 100 include a user management core layer 105 and a user management adapter layer 110. The user management core layer 105 interfaces with a collection of applications 115(1)-115(x) that require access to stored data. In the context of accessing data, the applications 115 may perform one or more of the following functions: (1) creating objects to be stored; (2) writing data associated with a previously created object; (3) reading stored data; and (4) searching for particular data. The user management adapter layer 110 includes a collection of individual user management adapters 165, 170, 175, and 180. The user management adapter layer 110 interfaces with a collection of data storage repositories 120, 125, 130, and 135, one or more of which may be geographically remote from the others, and maps data between the user management core layer 105 and the different data storage repositories 120, 125, 130, and 135. Data may be partitioned between the various data storage repositories 120, 125, 130, and 135 based on some predetermined criteria. For example, the particular data storage repository 120, 125, 130, and 135 in which an item of data is stored may be based on the user, group, role, or assignment with which the item of data is associated and/or may be based on the type of attribute that the item of data represents.

The user management core layer 105 includes a collection of application programming interfaces (APIs) 140, 145, 150, and 155 and a data storage manager 160. When an application 115 needs to access data in the data storage repositories 120, the application 115 sends a request to the data storage manager 160 using an appropriate API 140, 145, 150, and 155. For example, depending on the type of data to be accessed, the application 115 may select a user API 140, a user account API 145, a group API 150, or a role API 155. The user API 140 may generally handle information requests relating to the user himself (e.g., name, address, salary, position, and the like), while the user account API 145 handles technical information associated with the user's access to the computer system (e.g., the user's computer system password, days remaining until the current password expires, time of last login, the user's voicemail password, and the like. The group API 150 and role API 155 may generally handle access requests that relate to information associated with a group or role. In one implementation, the APIs 140, 145, 150, and 155 represent a JAVA-based interface between the applications 115 and the data storage manager 160.

Upon receiving an access request from an application 115, the data storage manager 160 determines which user management adapter(s) 165, 170, 175, and/or 180 to invoke and invokes the appropriate user management adapter(s) 165, 170, 175, and/or 180. As used herein, the term "invoke" is intended to refer to the process of contacting the user management adapter(s) 165, 170, 175, and/or 180 in preparation for creating, reading, writing, or searching data in the collection of repositories 120, 125, 130, and 135. For example, when attempting to perform a write data operation, the data storage manager 160 may contact multiple user management adapters 165, 170, 175, and 180 to identify which one is appropriate for storing the data to be written. The data storage manager 160 may invoke all of the user management adapters 165, 170, 175, and 180 or a subset of them depending on the information provided in the access request.

In this regard, the data storage manager 160 is pre-configured with knowledge of which user management adapters 165, 170, 175, and 180 exist, how to invoke the user management adapters 165, 170, 175, and 180, and which user management adapters 165, 170, 175, and 180 handle which types of data. For example, during a configuration process, the data storage manager 160 may read one or more extensible markup language (XML) documents that contain a description of the user management adapters 165, 170, 175, and 180. Part of the configuration data may include a set of rules that help to minimize the number of user management adapters 165, 170, 175, and/or 180 that are invoked. The set of rules may be used to determine which user management adapter 165, 170, 175, or 180 or which subset thereof to invoke, and this determination may be based on the configuration data loaded into the data storage manager 160 and/or on run time information obtained from the user management adapters 165, 170, 175, and 180.

Each of the user management adapters 165, 170, 175, and 180 knows its respective responsibilities (i.e., which types of data are stored in the repository 120, 125, 130, or 135 that corresponds to the user management adapter 165, 170, 175, or 180). Upon being invoked by the data storage manager 160, the user management adapter 165, 170, 175, or 180 determines if the corresponding repository 120, 125, 130, or 135 has any information that may be needed (e.g., in the case of a read or search operation) or if corresponding repository 120, 125, 130, or 135 represents the appropriate location for information to be stored (e.g., in the case of a write or create operation). If so, the user management adapter 165, 170, 175, or 180 executes the appropriate read, write, create, or search operation on the corresponding repository 120, 125, 130, or 135. Generally, however, the main logic for controlling the user management system 100 resides in the data storage manager 160.

The user management system 100 may provide flexible support for different types of repositories 120, 125, 130, and 135. The repositories may be differentiated by type based on the protocol used to access data, the way in which data is organized, the standardized and/or proprietary technology used, and the like. For example, the data storage manager 160 may be used to coordinate access to database repositories 120 (e.g., SQL Server, Oracle Database, and SAP DB or DB2); LDAP repositories 125 (e.g., provided by iPlanet, Novell, or ADS); SAP R/3 130, which is an application that stores user information; or a text file repository 135, which can be used for testing where no database or LDAP repository 120 or 125 is required. The data storage manager 160 may also be used to access other types of repositories. When integrating the applications and data storage components of a computer system, companies frequently have an existing type of repository that stores particular types of data or want to use a preferred type of repository so that they can easily implement software products from a particular vendor. A database repository 120 may be used in situations where the company does not have or does not want to have an LDAP repository 125 and also for application private data. An LDAP repository 125 may be used for public user and group attributes.

Each type of repository 120, 125, 130, or 135 has a corresponding type of user management adapter 165, 170, 175, or 180. Thus, the user management system 100 may include a database adapter 165, an LDAP adapter 170, an SAP R/3 adapter 175, and/or a text file adapter 180 for supporting and interfacing with one or more of the different types of repositories 120, 125, 130, and 135. In addition, the system 100 may include additional types of user management adapters for supporting other types of repositories.

The system 100 may also include multiple repositories of the same type. In the illustrated example, two database repositories 120(1) and 120(2), two LDAP repositories 125(1) and 125(2), and two SAP R/3 repositories 130(1) and 130(2) are shown. Each repository 120, 125, 130, or 135 has a corresponding instance of a user management adapter 165, 170, 175, or 180. Different user management adapter instances of the same type may share the same code but have different configuration data, which corresponds to the role of their respective repositories. For example, a first database repository 120(1) may be accessed by the data storage manager 160 using a first instance of the database adapter 165(1) that is configured to have knowledge of the types of data stored in the first database repository 120(1), while a second database repository 120(2) may be accessed using a second instance of the database adapter 165(2) that is configured to have knowledge of the types of data stored in the second database repository 120(2). Each database adapter 165, 170, 175, or 180 may be configured using an XML file to map data to the proper location in the respective repository 120, 125, 130, or 135.

The techniques of the present invention can be used to support centralized access to horizontally and/or vertically partitioned repositories. In horizontal partitioning, objects are selectively segregated between different repositories based on certain characteristics of the objects. For example, the user management system 100 can be configured to use different repositories for different sets of users, groups, roles, or assignments, with each user, group, role, and/or assignment representing an object. As a more specific example, an enterprise that has multiple regional locations (e.g., a European division and a U.S. division) can, and typically will, maintain different user management data repositories. The U.S. division will have a repository that stores user management data for U.S. employees, and the European division will have a separate repository that stores user management data for European employees. Rather than having to combine and reconcile the different repositories into a single repository, the techniques described here can be used to treat the separate repositories as a logical whole, even though the repositories are partitioned from each other and even though they may be of disparate types. These techniques may be used to create, read, write, or search user objects from applications that have no knowledge of the different repositories. In other words, a single application might create user objects for both divisions by sending the user data to the data storage manager 160, which then identifies which repository is appropriate and stores the user object in the identified repository.

In another possible scenario, different departments within the enterprise may maintain different user data repositories. The Human Resources (HR) department might maintain a user management repository for employees and one or more separate user management repositories for suppliers, partner companies, and independent contractors working on site. By logically combining the repositories, it may be possible to search both repositories and otherwise treat both repositories as a single logical whole.

In vertical partitioning, object attributes stored (e.g., user management data concerning a particular user, group, role, or assignment) in a second repository supplement object attributes (e.g., user management data concerning that same user, group, role, or assignment) in a first repository. Thus, the user management system 100 can be configured so that different attributes are written to different repositories. For example, an enterprise may have several different departments, each of which maintains a separate user management data repository. The HR department might maintain a first repository that stores employee names, addresses, position, salary, and other factual data, while another department maintains the company directory. The latter department can maintain a second repository that supplements the user data in the first repository. Thus, the second repository might store an employee's picture, current work projects, and the like. The described user management techniques may allow the company directory system to treat the first and second repositories as a logical whole and draw user management information from both repositories to more fully define a particular user, role, group, or assignment. Similarly, companies may want to limit what attributes are written to a corporate LDAP (e.g., they do not want application specific data written to the corporate LDAP). The techniques described here can be used to facilitate storing such attributes in different repositories while allowing them to be easily accessible in a manner that is undetectable by the requesting application.

In connection with the partitioning of data in two dimensions, certain rules may be implemented to define where information is stored. In one implementation, every object has only one home adapter/repository that defines whether the object exists. As a result, objects with the same identifier cannot exist in different adapters/repositories (e.g., the system does not support situations where the same user ID is stored in two different LDAP repositories). When an object is created, the home adapter/repository is determined based on some of the object's attributes. For example, when a new user object is created, the home adapter/repository may be selected based on the division for which the user works. For reading and searching, the adapters/repositories are searched in a fixed order and the first adapter/repository returning the object is determined to be the home adapter/repository (i.e., it is assumed that there is only one match). The use of a home adapter/repository relates to horizontal partitioning. Vertical partitioning, on the other hand, is supported by assigning different attributes to different adapters/repositories. Thus, for each attribute, it may be specified where the attribute data is stored. Once an object is created in the home adapter/repository, additional attributes that relate to the object may be stored in other repositories.

Figures 2, 3:
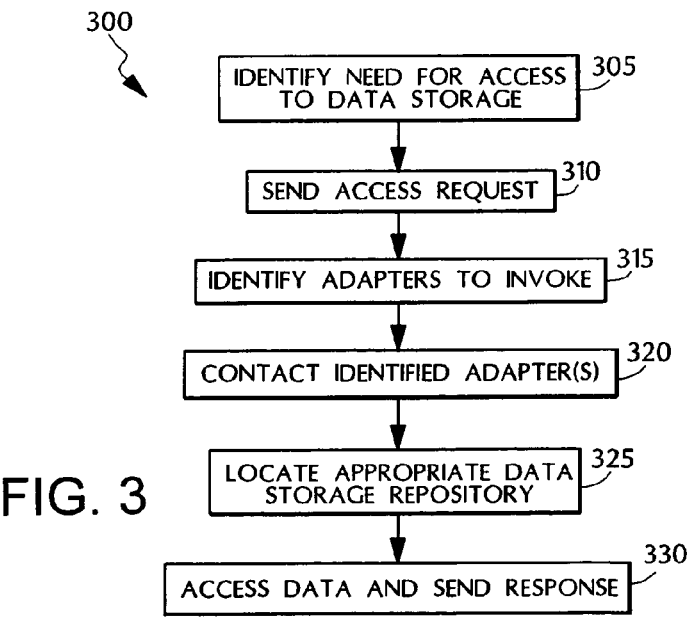
FIG. 2 is a chart showing an illustrative example of horizontal and vertical data partitioning among different repositories.
FIG. 3 is a flowchart showing a process for accessing data stored in a collection of repositories.

FIG. 2 shows a chart 200 illustrating an example of horizontal and vertical partitioning of data among different repositories. In this example, objects are horizontally partitioned into four different user object categories 205—European users, U.S. users, independent contractors, and groups. The home repository for European users is a European LDAP repository 125(1), for U.S. users is a U.S. database repository 120(1), for independent contractors is an external LDAP repository 125(2), and for groups is a corporate database repository 120(2). The home repositories not only serve to define whether particular objects exist, they also store certain attributes for the various objects. Two other repositories—a European SAP R/3 repository 130(1) and a U.S. SAP R/3 repository 130(2)—also exist for storing additional attributes. Although these other repositories are not shown as serving the function of a home repository in this example, the other repositories could serve as a home repository for some other type of object, such as assignment objects.

Vertical partitioning may be accomplished by assigning different attributes for the same object to different repositories. In particular, attributes 210 are vertically partitioned into different repositories. In the illustrated example, each employee's name, address, and position are stored in the European LDAP repository 125(1) for European users and in the U.S. database repository 120(1) for U.S. users. In addition, each employee's picture and a list of current projects are stored in the European SAP R/3 repository 130(1) for European users and in the U.S. SAP R/3 repository 130(2) for U.S. users. For independent contractors, each user's name, address, position, and current projects are stored in an external LDAP repository 125(2). Finally, the group name, the current projects, and group members for each group are stored in a corporate database repository 120(2).

FIG. 3 illustrates a process 300 for accessing data that is stored in a collection of repositories. The process begins with an identification of a need for access to data storage (step 305). For example, an application 115 may need to create a new object or to store additional attributes for an existing object. Alternatively, an application 115 might need to read a particular-attribute associated with an existing object or search for whether a particular object exists. Once the need for data storage access is identified, a request for such access is sent to the data storage manager 160 (step 310). Generally, the application 115 requesting the data storage access will identify the appropriate type of API based on the type of access needed. For example, if the access relates to creating, reading, writing, or searching role data, the application 115 will select the role API 155. In addition, the access request will typically include at least one attribute identifier for indicating the type of attribute(s) and/or at least one attribute value (e.g., a numerical value, a text string, and the like).

After receiving the data access request, the data storage manager 160 identifies one or more adapters that may be associated with a repository that stores data associated with the data access request (step 315). The identification of the appropriate adapter or adapters may be based on configuration information stored in the data storage manager 160 and/or on information obtained from the adapters themselves. Referring again to the example discussed in connection with FIG. 2, if an application sends a request to the data storage manager 160 to create a user object, the data storage manager 160 might consult configuration information indicating that user objects are created in a European LDAP repository 125(1), a U.S. database repository 120(1), or an external LDAP repository 125(2). Accordingly, the data storage manager 160 would identify the user management adapters 170(1), 165(1), and 170(2) that correspond to the appropriate repositories 125(1), 120(1), and 125(2).

The identified adapters 170(1), 165(1), and 170(2) would then be contacted by the data storage manager 160 (step 320) by, for example, forwarding the request received from the application 115. As a result, each identified adapter 170(1), 165(1), or 170(2) could determine if its associated repository is the appropriate location for the data referenced in the data access request (step 325). In some cases, the data that is responsive to the data access request may reside in more than one repository. In such a case, the requested data access may involve accessing data in more than one repository. For example, if an application requests information on a particular employee name, phone number, and department may be stored in one repository while a picture of the employee is stored in another. Thus, the requested information may be retrieved from more than one repository. The requested data access can then be completed and a response sent to the requesting application 115, if necessary (step 330).

Various implementations of the data storage manager 160 and user management adapters 165, 170, 175, and 180 described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software Applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although only a few embodiments have been described in detail above, other modifications are possible. Portions of this disclosure discuss use of the systems and techniques in connection with user management data, but the systems and techniques can also be applied in connection with other types of data.

Other embodiments may be within the scope of the following claims.

What is claimed is:

1. A method for accessing data in a computer system, the method comprising:

receiving a data access request at a data storage manager, the data access request including at least one of a request to write data or a request to read data, a user management layer comprising the data storage manager and a plurality of application programming interfaces, the user management layer interfacing a plurality of applications, at least one of the applications providing the data access request, the user management layer further interfacing a plurality of adapters each configured to determine whether at least one of a plurality of repositories has information needed to respond to the data access request and a location for at least one of the plurality of repositories, the plurality of adapters each interfacing at least one of the plurality of repositories, wherein the data storage manager, the plurality of application programming interfaces, and the plurality of adapters are implemented using at least one of a processor and a memory;

identifying from the plurality of repositories at least one repository that satisfies the data access request using, at least in part, rules stored in the data storage manager identifying at least one of the plurality of adapters for the data access of the at least one repository, wherein the plurality of repositories includes repositories of at least two different types that store information relating to data objects and data from each data object is selectively partitioned among the at least two different types of repositories, wherein the plurality of application programming interfaces comprise a user application programming interface, a group application programming interface, a role application programming interface, and a user account application programming interface, the data storage manager coupled to the at least one adapter; and fulfilling the data access request using the at least one identified repository to perform at least one of writing data to a repository or reading data from a repository.

2. The method of claim 1 wherein data relating to different data objects is selectively partitioned among the repositories according to characteristics of the data objects.

3. The method of claim 2 wherein at least one attribute is associated with each data object.

4. The method of claim 3 wherein data relating to different attributes of each data object is further selectively partitioned among the repositories according to characteristics of the attributes.

5. The method of claim 4 wherein identifying at least one repository comprises determining which of the repositories store data requested in the data access request based on characteristics of the requested data identified in the data access request.

6. The method of claim 5 wherein identifying at least one repository comprises:

identifying a subset of the repositories based on the rules stored in the data storage manager; and determining which of the subset of repositories store the requested data based on information stored in an adapter associated with each repository.

7. The method of claim 4 wherein data defining the existence of a first data object is stored in a first repository and data defining the existence of a second data object is stored in a second repository.

8. The method of claim 7 wherein data relating to a first attribute of the first data object is stored in the first repository and data relating to a second attribute of the first data object is stored in a third repository.

9. The method of claim 4 wherein the data objects and attributes stored in the repositories relate to user management data.

10. The method of claim 1 wherein the types of repositories are differentiated based on differences in at least one of: protocols used to access data, the manner in which data is organized, or the technology upon which the repositories are based.

11. The method of claim 1 wherein the repositories are logically combined such that the existence of different types of repositories in the repositories is immaterial to an entity requesting the data access.

12. The method of claim 1 wherein the data access request relates to a data access selected from the group consisting of creating a data object, writing data, reading data, and searching data.

13. A data storage system for a computer system, the data storage system comprising:

a plurality of data repositories for storing data objects, wherein the plurality of repositories includes data repositories of at least two different types, wherein data for each data object is partitioned among the at least two different types of data repositories based on characteristics of the data in the computer system; and a data storage manager operable to receive a data access request from one or more of a plurality of applications, to identify an appropriate data repository for fulfilling the data access request using, at least in part, rules stored in the data storage manager identifying at least one adapter for the data access of the at least one repository, and to access the requested data in accordance with the data access request, the data access request including at least one of a request to write data to a repository or to read data from a repository, a user management layer comprising the data storage manager and a plurality of application programming interfaces, the user management layer interfacing the plurality of applications, at least one of the applications providing the data access request, wherein the plurality of application programming interfaces comprise a user application programming interface, a group application programming interface, a role application programming interface, and a user account application programming interface, the data storage manager coupled to the at least one adapter, the user management layer further interfacing a plurality of adapters each configured to determine whether at least one of a plurality of repositories has information needed to respond to the data access request and a location for at least one of the plurality of repositories, the plurality of adapters each interfacing at least one of the plurality of repositories.

14. The system of claim 13 wherein the plurality of data repositories includes at least two different types of data repositories.

15. The system of claim 14 wherein the data repositories are distinguishable by type based on at least one of protocols used to access data, the manner in which data is organized, or the technology upon which the repositories are based.

16. The system of claim 13 wherein the plurality of repositories store information relating to a plurality of data objects.

17. The system of claim 16 wherein data is partitioned among the repositories according to at least one of data object types and attribute types.

18. The system of claim 13 further comprising at least one application program interface for interfacing the applications with the data storage manager.

19. The system of claim 13 further comprising an adapter associated with each repository for interfacing the data storage manager with the repositories.

20. The system of claim 19 wherein the data storage manager stores adapter information relating to which adapters are available and what types of data are handled by each of the adapters.

21. The system of claim 20 wherein the data storage manager uses the adapter information to identify the appropriate data repository for fulfilling the data access request.

22. The system of claim 21 wherein the data storage manager further contacts at least one adapter and uses information received from the at least one adapter to identify the appropriate data repository.

23. The system of claim 22 wherein each adapter stores information identifying data types handled by the adapter and maps data between the data storage manager and the data repository.

24. An article comprising a machine-readable medium storing instructions operable to cause one or more machines to perform operations comprising:

receiving a data access request at a data storage manager, the data access request including at least one of a request to write data to a repository or a request to read data from a repository, a user management layer comprising the data storage manager and a plurality of application programming interfaces, the user management layer interfacing a plurality of applications, at least one of the applications providing the data access request, wherein the plurality of application programming interfaces comprise a user application programming interface, a group application programming interface, a role application programming interface, and a user account application programming interface, the data storage manager coupled to the at least one adapter, the user management layer further interfacing a plurality of adapters each configured to determine whether at least one of a plurality of repositories has information needed to respond to the data access request and a location for at least one of the plurality of repositories, the plurality of adapters each interfacing at least one of the plurality of repositories;

identifying, using a data storage manager and at least one adapter, at least one repository from a plurality of repositories for satisfying the data access request using, at least in part, a set of data partitioning rules, wherein the plurality of repositories includes at least two different types of repositories and data from at least one single data object is selectively partitioned among the at least two different types of repositories; and fulfilling the data access request using the at least one identified repository.

25. The article of claim 24 wherein the machine-readable medium further stores instructions operable to cause one or more machines to perform operations comprising:

partitioning data from each single data object among the repositories based on user object attributes with which the data is associated.

26. The article of claim 24 wherein the machine-readable medium further stores instructions operable to cause one or more machines to perform operations comprising:

searching an adapter associated with each repository to identify the at least one repository for satisfying the data access request; and wherein the data access request is fulfilled through the adapter associated with the at least one identified repository.

* * * * *

UNITED STATES PATENT AND TRADEMARK OFFICE
CERTIFICATE OF CORRECTION

PATENT NO. : 7,599,959 B2  Page 1 of 1
APPLICATION NO. : 10/308204
DATED : October 6, 2009
INVENTOR(S) : Friedrich et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 404 days.

Signed and Sealed this

Twenty-eighth Day of September, 2010

David J. Kappos
*Director of the United States Patent and Trademark Office*